US009788299B2

(12) United States Patent
Lam et al.

(10) Patent No.: US 9,788,299 B2
(45) Date of Patent: Oct. 10, 2017

(54) BASE STATION PAGING BASED ON TRAFFIC CONTENT TYPE

(71) Applicant: Verizon Patent and Licensing Inc., Arlington, VA (US)

(72) Inventors: Maria G. Lam, Oakland, CA (US); Imtiyaz Shaikh, Irving, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 267 days.

(21) Appl. No.: 13/869,654

(22) Filed: Apr. 24, 2013

(65) Prior Publication Data
US 2014/0323145 A1    Oct. 30, 2014

(51) Int. Cl.
*H04W 24/00* (2009.01)
*H04W 68/02* (2009.01)
*H04W 68/04* (2009.01)
*H04W 68/06* (2009.01)
*H04W 68/08* (2009.01)

(52) U.S. Cl.
CPC ............ *H04W 68/02* (2013.01); *H04W 68/04* (2013.01); *H04W 68/06* (2013.01); *H04W 68/08* (2013.01)

(58) Field of Classification Search
CPC ..... H04W 68/02; H04W 68/04; H04W 68/06; H04W 68/08
USPC .................... 370/310; 455/456.1, 458, 435.1
See application file for complete search history.

(56) References Cited

U.S. PATENT DOCUMENTS

| | | | |
|---|---|---|---|
| 2008/0014956 A1* | 1/2008 | Balasubramanian | ...... 455/452.1 |
| 2008/0089324 A1* | 4/2008 | Polk | ....... H04L 65/608 370/389 |
| 2008/0133675 A1* | 6/2008 | Ramanathan | ........... H04L 51/04 709/206 |
| 2008/0263212 A1* | 10/2008 | Goix | ................. H04L 29/06027 709/228 |
| 2008/0293441 A1* | 11/2008 | Laumen | .............. H04L 12/5895 455/466 |
| 2009/0119382 A1* | 5/2009 | Bakker | ............... H04L 65/1016 709/206 |
| 2010/0067519 A1* | 3/2010 | Mang et al. | ................... 370/352 |
| 2010/0195610 A1* | 8/2010 | Zhong | ................. H04L 65/1016 370/329 |
| 2010/0316045 A1* | 12/2010 | Przybysz | ................ H04L 47/10 370/352 |

(Continued)

OTHER PUBLICATIONS

"SIP Headers", tutorialspoint Simplyeasylearning, obtained from Google search "SIP Header image", dated Jan. 26, 2017, p. 1-p. 3.*

*Primary Examiner* — Barry Taylor

(57) ABSTRACT

A system may be configured to receive traffic that is destined for a user device, determine a type of content associated with the traffic, determine, based on the type of content, a base station paging scheme, and locate the user device by using the base station paging scheme. In some implementations, a system may include a traffic content analyzer device to analyze header information of a data packet to identify a type of content of the data packet, and output a message that is based on the identified type of content; and a mobile management entity device to receive the message from the traffic content analyzer device, and locate an intended recipient of the data packet by paging one or more base stations using a paging scheme that is based on information in the message.

20 Claims, 13 Drawing Sheets

(56) References Cited

U.S. PATENT DOCUMENTS

2011/0035495 A1* 2/2011 Ekstrom ................ H04L 47/10
                                                              709/225
2012/0087313 A1* 4/2012 Yin et al. ...................... 370/328
2013/0316706 A1* 11/2013 Knauft ........................ 455/435.1
2014/0169169 A1* 6/2014 Almog et al. ................ 370/235

* cited by examiner

300 ⤴

| Traffic content type | Paging scheme |
|---|---|
| Voice | C, D, D, E |
| Video | B, C, D, E |
| Text | A, A, C, E |
| Other | A, B, B, C |

| Paging technique designation | Paging technique |
|---|---|
| A | Last known base station |
| B | Last known tracking area |
| C | Enlarged last known tracking area |
| D | Last known + neighboring tracking areas |
| E | All base stations |

FIG. 4

BASE STATION PAGING BASED ON TRAFFIC CONTENT TYPE

BACKGROUND

Networks, such as wireless telecommunications networks, may provide services to users, such as voice call services, video call services, short messaging service ("SMS") message services, and/or other services. Some networks implement a "paging" methodology, whereby when a service is to be provided to a user device, such as an incoming telephone call for the user device, the network will attempt to locate the user device. For instance, paging the user device may include determining at which base station, associated with the network, the user device is presently attached.

BRIEF DESCRIPTION OF THE DRAWINGS

FIGS. 3 and 4 illustrate example data structures that may be stored by a traffic content analyzer and/or another device;

DETAILED DESCRIPTION OF PREFERRED EMBODIMENTS

The following detailed description refers to the accompanying drawings. The same reference numbers in different drawings may identify the same or similar elements.

When traffic is to be sent to a user device (e.g., a wireless telephone), a network may page one or more base stations, in order to determine to which base station the user device is attached. Various different schemes may be used to page base stations, with some schemes being more aggressive than others. Aggressive paging schemes may provide a relatively high level of service (e.g., the base station, to which the user device is attached, may be found relatively quickly). However, these aggressive paging schemes may be relatively costly (e.g., a relatively large amount of resources may be consumed when paging according to aggressive schemes). On the other hand, less aggressive paging schemes may provide a relatively lower level of service, but may be less costly.

Thus, it may be advantageous to use aggressive paging schemes in some situations, while using less aggressive paging schemes in other situations. For example, a network provider may desire to use an aggressive paging scheme for real time services, such as voice services. This may ensure that telephone calls are connected quickly, and may reduce the likelihood that calls will be missed. Furthermore, voice calls may be a lucrative source of income for network providers, therefore increasing the motivation for providing a high level of service for voice calls.

On the other hand, a network provider may desire to use a less aggressive paging scheme for non-real time services, such as short message service ("SMS") messages, as such non-real time services may be viewed as less time-critical. Furthermore, smart devices, such as smart phones, may tend to be more "chatty," in that multiple applications messages may be running on a smart device most of the time, thus increasing the likelihood that the user device's location is known to the network. Since the likelihood that the user device's location is known to the network, a less aggressive paging scheme may be as effective in locating the user device as a more aggressive one, but may consume fewer resources to do so.

Figure 1:
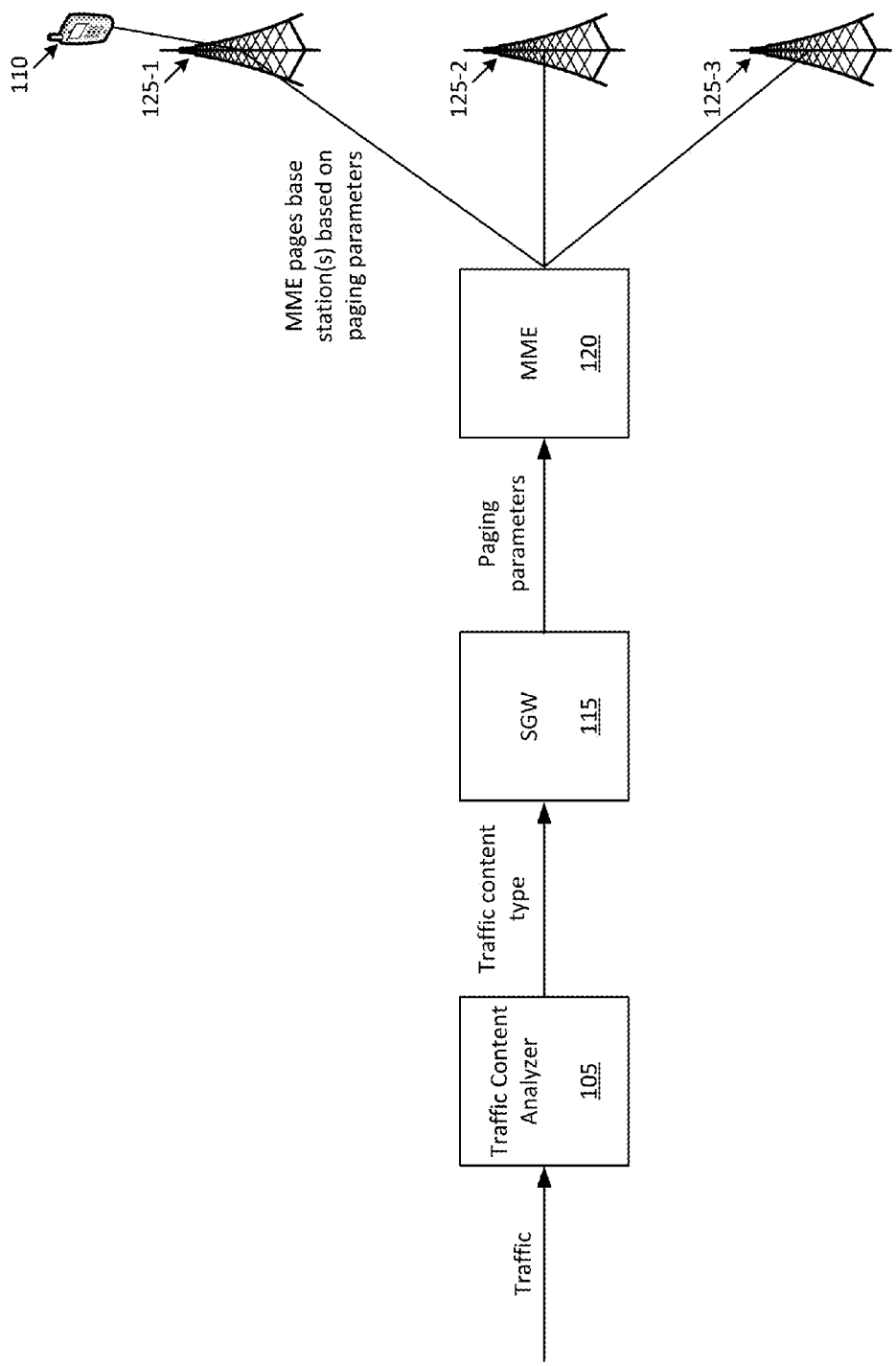
FIG. 1 illustrates an overview of one or more example implementations described herein.

Techniques described herein may allow for a network to perform base station paging based on the type of content in a message. FIG. 1 illustrates an overview of one or more example implementations described herein. As shown in FIG. 1, traffic content analyzer 105 may receive traffic that is being sent to user device 110. As described below, traffic content analyzer 105 may receive the traffic from a device in a network, such as a packet data network ("PDN") gateway ("PGW"). Traffic content analyzer 105 may analyze the traffic to determine a type of content associated with the traffic. For instance, the traffic may include one or more data packets, which traffic content analyzer 105 may analyze to determine the type of content. In some implementations, as described below, traffic content analyzer 105 may determine the type of content of a packet based on information in a header of the packet (e.g., a "content type" field in the header).

Traffic content analyzer 105 may output information identifying the type of content to serving gateway ("SGW") 115. In some implementations, SGW 115 may identify a set of paging parameters (e.g., a paging scheme) associated with the type of content. SGW 115 may output the paging parameters to mobile management entity ("MME") 120, which may be responsible for performing base station paging, in order to locate user device 110. MME 120 may page one or more of base stations 125-1 through 125-3 (hereinafter referred to individually as "base station 125," or collectively as "base stations 125"). For instance, MME 120 may send a message to one or more base stations 125, requesting a response as to whether user device 110 is attached to a respective base station 125. As described below, the paging parameters, provided by SGW 115, may dictate a quantity of base stations 125 that are paged by MME 120, an order in which MME 120 pages base stations 125, and/or a quantity of attempts that MME 120 makes to locate user device 110 via base station paging.

For instance, if the traffic includes a SMS message, the paging parameters may indicate that a "last known base station" paging technique should be used first, and then other techniques should be used if user device 110 cannot be located using the last known base station paging technique. For instance, assume that MME 120 stores information indicating that base station 125-1 is the last base station to which user device 110 was attached. The last known base station paging technique may dictate that MME 120 should page base station 125-1, to determine whether user device 110 is still attached to base station 125-1. As mentioned above, smart devices may tend to be more chatty, such that user device 110 may be attached to base station 125-1 while SMS messages are to be sent to user device 110. Thus, resources may be saved by not paging base stations 125-2 and 125-3.

As another example, if the traffic includes a voice call, the paging parameters may indicate that a "last known tracking area," a "last known and neighboring tracking areas," and/or an "all base stations" paging scheme should be used to locate user device 110. In these paging schemes, multiple base stations 125 may be paged, thus theoretically speeding up the process of locating user device 110, in cases where user device 110 has attached to a particular base station 125 that is not the last known base station 125. Thus, these paging schemes may be viewed as being more "aggressive" than a last known base station paging scheme. Thus, by performing paging based on content type, some implementations may provide a high level of service when necessary, and may preserve resources when a high level of service is not as necessary.

Figure 2:
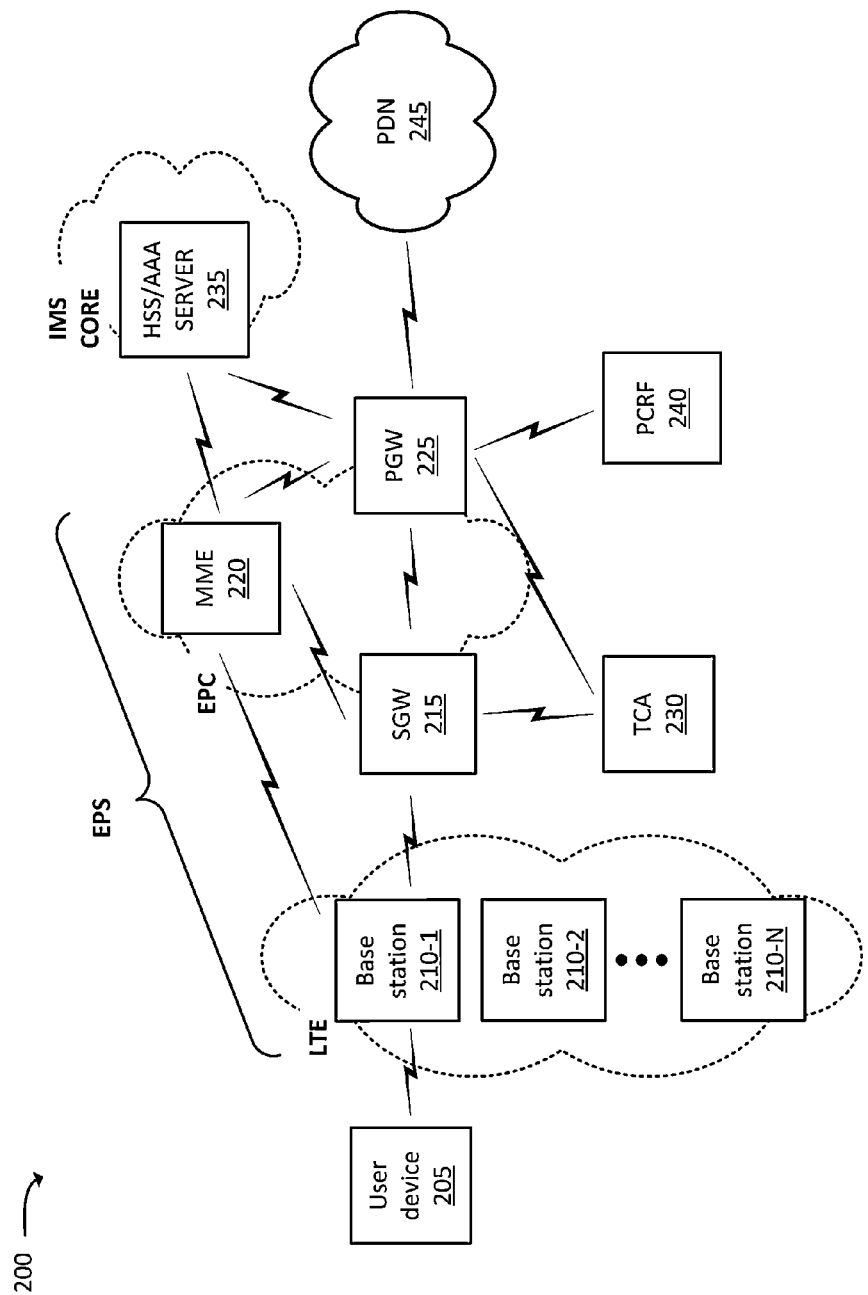
FIG. 2 illustrates an example environment in which systems and/or methods, described herein, may be implemented.

FIG. 2 illustrates an example environment 200, in which systems and/or methods described herein may be implemented. As shown in FIG. 2, environment 200 may include user device 205 and base stations 210-1 through 210-N (where N is an integer that is greater than 2). Base stations 210-1 through 210-N may be hereinafter referred to collectively as "base stations 210," and individually as "base station 210." In some implementations, base stations 210 may take the form of evolved node Bs ("eNBs")). Environment 200 may further include SGW 215, MME 220, PGW 225, traffic content analyzer 230, home subscriber server ("HSS")/authentication, authorization, accounting ("AAA") server 235 (hereinafter referred to as "HSS/AAA server 235"), policy charging and rules function ("PCRF") 240, and PDN 245.

The quantity of devices and/or networks, illustrated in FIG. 2, is provided for explanatory purposes only. In practice, there may be additional devices and/or networks; fewer devices and/or networks; different devices and/or networks; or differently arranged devices and/or networks than illustrated in FIG. 2. Alternatively, or additionally, one or more of the devices of environment 200 may perform one or more functions described as being performed by another one or more of the devices of environment 200. Devices of environment 200 may interconnect via wired connections, wireless connections, or a combination of wired and wireless connections.

Environment 200 may include an evolved packet system ("EPS") that includes a LTE network and/or an evolved packet core ("EPC") network that operate based on a third generation partnership project ("3GPP") wireless communication standard. The LTE network may be, or may include, a radio access network ("RAN") that includes one or more base stations 210, some or all of which, may take the form of an eNB, via which user device 205 may communicate with the EPC network. The EPC network may include one or more SGWs 215, MMEs 220, and/or PGWs 225, and may enable user device 205 to communicate with PDN 245 and/or an Internet protocol ("IP") multimedia subsystem ("IMS") core network. The IMS core network may include HSS/AAA server 235, and may manage authentication, session initiation, account information, a user profile, etc. associated with user device 205.

User device 205 may include any computation and communication device, such as a wireless mobile communication device that is capable of communicating with base station 210 and/or PDN 245. For example, user device 205 may include a radiotelephone; a personal communications system ("PCS") terminal (e.g., a device that combines a cellular radiotelephone with data processing and data communications capabilities); a personal digital assistant ("PDA") (e.g., that can include a radiotelephone, a pager, Internet/intranet access, etc.); a smart phone; a laptop computer; a tablet computer; a camera; a personal gaming system, or another type of mobile computation and communication device. User device 205 may send traffic to and/or receive traffic from PDN 245 via signal bearers, such as base station 210, SGW 215, and/or PGW 225.

Base station 210 may include one or more network devices that receive, process, and/or transmit traffic, such as calls, audio, video, text, and/or other data, destined for and/or received from user device 205. In one example, base station 210 may be an eNB device and may be part of the LTE network. Additionally, or alternatively, one or more other base stations 210 may be associated with a RAN that is not associated with the LTE network (e.g., a wireless hot spot, a wireless access point, etc.). Base station 210 may receive traffic from and/or send traffic to PDN 245 via SGW 215 and PGW 225. Base station 210 may send traffic to and/or receive traffic from user device 205 via an air interface.

In some implementations, at any given time, user device 205 may be attached to a particular base station 210. For example, as shown in FIG. 2, user device 205 may be attached to base station 210-1. When user device 205 is attached to base station 210-1, user device 205 may send and/or receive traffic to and/or from base station 210-1. Base stations 210 may respond to paging requests (e.g., paging requests sent by MME 220), in order to aid MME 220 in identifying to which base station 210 is attached. For instance, assume that MME 220 sends a paging request to base stations 210-1 and 210-2, requesting information regarding an attachment status of user device 205. Base station 210-1 may respond by indicating that user device 205 is attached to base station 210-1, and base station 210-2 may respond by indicating that user device 205 is not attached to base station 210-2 (or may forgo responding to the paging request).

SGW 215 may include one or more network devices that gather, process, search, store, and/or provide information in a manner described herein. SGW 215 may, for example, aggregate traffic received from one or more base stations 210 and may send the aggregated traffic to PDN 245 (and/or another network) via PGW 225. In some implementations, SGW 215 may aggregate traffic received from one or more PDNs (e.g., PDN 245, the IMS core network, and/or another network), and may send the aggregated traffic to user device 205 via base station 210.

In some implementations, as described below, SGW 215 may receive a notification (e.g., from traffic content analyzer 230) that traffic is being sent to user device 205. As described below, this notification may indicate a type of content associated with the traffic. Based on the content type, SGW 215 may determine a paging scheme that MME 220 should use to locate user device 205 (e.g., to which base station 210 user device 205 is attached). SGW 215 may generate a downlink data notification ("DDN"), which may indicate that the particular paging scheme should be used. SGW 215 may output this DDN to MME 220, which may use the paging scheme to locate user device 205. SGW 215 may receive information from MME 220 once MME 220 has located user device 205. This information may indicate a particular base station 205, to which SGW 215 should forward the traffic.

MME 220 may include one or more computation and communication devices that perform operations to register user device 205 with the EPS, to establish bearer channels associated with a session with user device 205, to hand off user device 205 from the EPS to another network, to hand off user device 205 from the other network to the EPS, and/or to perform other operations. MME 220 may perform policing operations on traffic destined for and/or received from user device 205. As discussed above, MME 220 may, in some implementations, perform base station paging operations, in order to locate user device 205. For instance, MME 220 may receive a DDN from SGW 215, which may indicate a paging scheme to use. MME 220 may locate user device 205 based on this paging scheme, and may output information identifying the relevant base station 210 to SGW 215.

PGW 225 may include one or more network devices, or other types of computation and communication devices, that gather, process, search, store, and/or provide information in a manner described herein. For instance, PGW 225 may aggregate traffic received from one or more SGWs 215, etc. and may send the aggregated traffic to PDN 245 and/or to another network. PGW 225 may also, or alternatively, receive traffic from PDN 245 and/or another network, and may send the traffic toward user device 205 via SGW 215 and/or base station 210.

HSS/AAA server 235 may include one or more server devices, or other types of devices, that gather, process, search, store, and/or provide information. For example, HSS/AAA server 235 may manage, update, and/or store, in a memory associated with HSS/AAA server 235, profile information associated with a subscriber. The profile information may identify applications and/or services that are permitted for and/or accessible by the subscriber; a mobile directory number ("MDN") associated with the subscriber; bandwidth or data rate thresholds associated with the applications and/or services; information associated with the subscriber (e.g., a username, a password, etc.); rate information; minutes allowed for a subscriber; and/or other information. The subscriber may be associated with user device 205 and/or one or more other user devices 205. Additionally, or alternatively, HSS/AAA server 235 may perform authentication, authorization, and/or accounting operations associated with the subscriber and/or a communication session with user device 205.

PCRF 240 may include one or more server devices, or other types of devices, that aggregate information to and from the EPC network and/or other sources. PCRF 240 may receive information regarding policies and/or subscriptions from one or more sources, such as subscriber databases and/or from one or more users (such as, for example, an administrator associated with PCRF 240).

PDN 245 may include one or more wired and/or wireless networks. For example, PDN 245 may include an Internet Protocol ("IP")-based PDN. PDN 245 may include, for example, a wide area network such as the Internet, or one or more other networks. User device 205 may connect, through PGW 225, to data servers, application servers, or to other servers/applications that are coupled to PDN 245.

FIGS. 3 and 4 illustrate example data structures 300 and 400, respectively, which may be stored by traffic content analyzer 230 and/or one or more other devices. For example, one or both of data structures 300 and 400 may be stored by SGW 215 and/or MME 220. As shown in FIG. 3, data structure 300 may include information correlating traffic content types to paging schemes. A particular paging scheme may indicate a sequence of paging techniques that should be used. Different paging techniques may be denoted by different names, or other designations. For example, the example paging techniques shown in FIG. 3 are designated by the letters "A," "B," "C," "D," and "E." Examples of the paging techniques that correspond to these designations are discussed below with respect to FIG. 4.

For example, as shown in FIG. 3, a voice content type may correspond to a paging scheme of "C, D, D, E." Thus, this paging technique may indicate that the paging technique, denoted by the letter "C," should be attempted once, and that if user device 205 cannot be located after the first attempt using paging technique "C," paging technique "D" should be attempted twice. If user device 205 cannot be located after two attempts of using paging technique "D," paging technique "E" should be used. As another example, as also shown in FIG. 3, a video content type may correspond to a paging scheme of "B, C, D, E." In this paging scheme, paging technique "B" should be used first. If paging technique "C" is unsuccessful in locating user device 205, paging technique "D" should be used, and so on.

Data structure 400, in FIG. 4, may correlate designations of paging techniques to names of paging techniques. For example, paging technique "A" may be associated with a "last known base station" paging technique, paging technique "B" may be associated with a "last known tracking area" paging technique, paging technique "C" may be associated with an "enlarged last known tracking area" paging technique, paging technique "D" may be associated with a "last known base station and neighboring tracking areas" paging technique, and paging technique "E" may be associated with an "all base stations" paging technique. FIGS. 5-9 conceptually illustrate the example paging techniques shown in FIG. 4.

Figure 5:
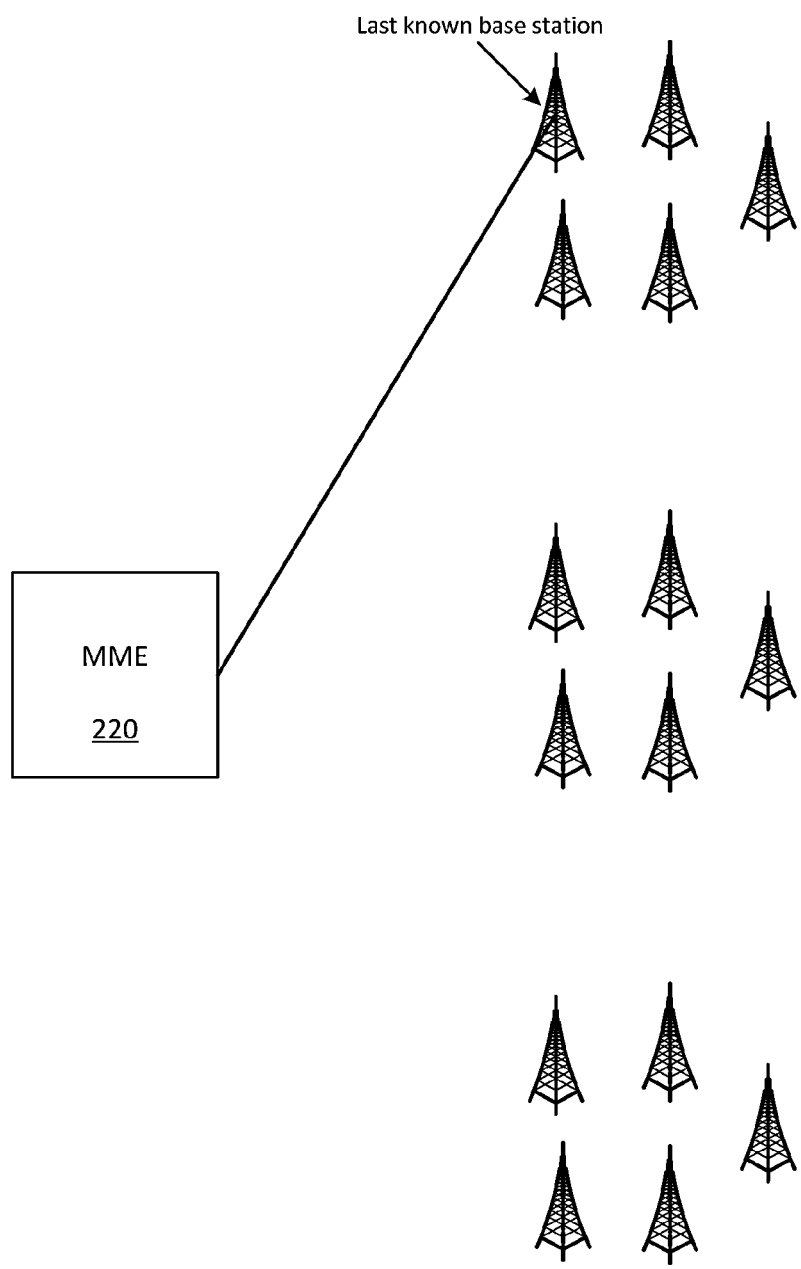
FIGS. 5-9 conceptually illustrate various paging schemes.

As discussed above, the last known base station paging technique may be a technique whereby MME 220 pages the last base station 210, at which user device 205 is known to have attached. For example, MME 220 may store information identifying a particular last known base station 210, at which user device 205 was located in response to a previous paging operation. FIG. 5 conceptually illustrates a last known base station paging technique, according to one or more implementations. For example, assume that MME 220 stores information identifying the last base station 210 at which a particular user device was attached. When locating the user device, by using the last known base station paging technique, MME 220 may send a paging request to the last known base station 210 (e.g., only to the last known base station 210, and not to any other base stations 210).

Figure 6:
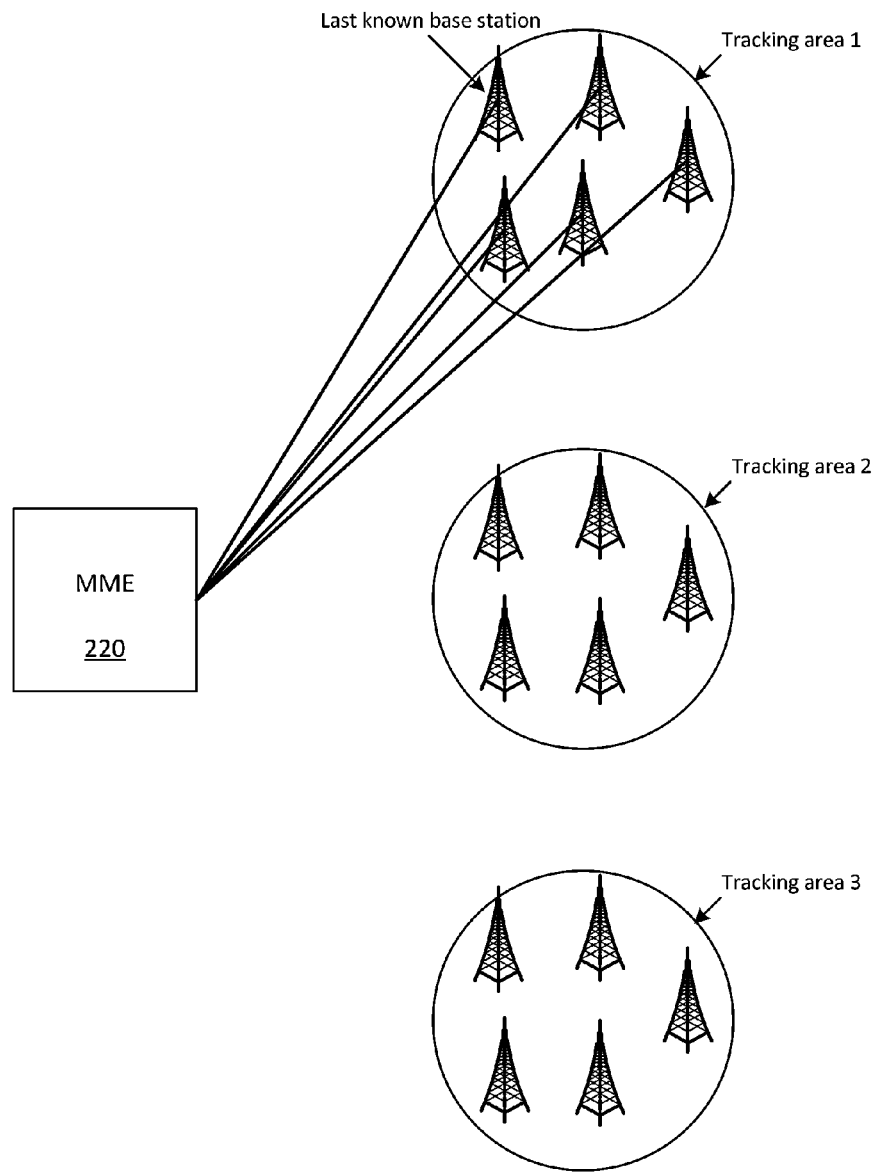

The last known tracking area paging technique may be a technique whereby MME 220 pages the last known base station 210, as well as other base stations 210 near the last known base station 210. For instance, MME 220 may send a paging request to the last known base station 210, as well as base stations within a particular distance (e.g., within 1 kilometer, within 10 kilometers, etc.). In some implementations, base stations 210 may be clustered into groups, also referred to as "tracking areas." These tracking areas may be defined manually (e.g., by an administrator), and/or may be generated or modified automatically (e.g., by MME 220 and/or by another device) based on geographic location of base stations 210. As shown in FIG. 6, the last known base station 210 and other nearby base stations 210 may be grouped into one tracking area ("tracking area 1"), while other base stations 210 may grouped into other tracking areas ("tracking area 2" and "tracking area 3"). When locating the user device, by using the last known tracking area paging technique, MME 220 may send a paging request to base stations 210 in tracking area 1 (e.g., only to the tracking area associated with the last known base station 210, and not to any other base stations 210 of other tracking areas).

Figure 7:
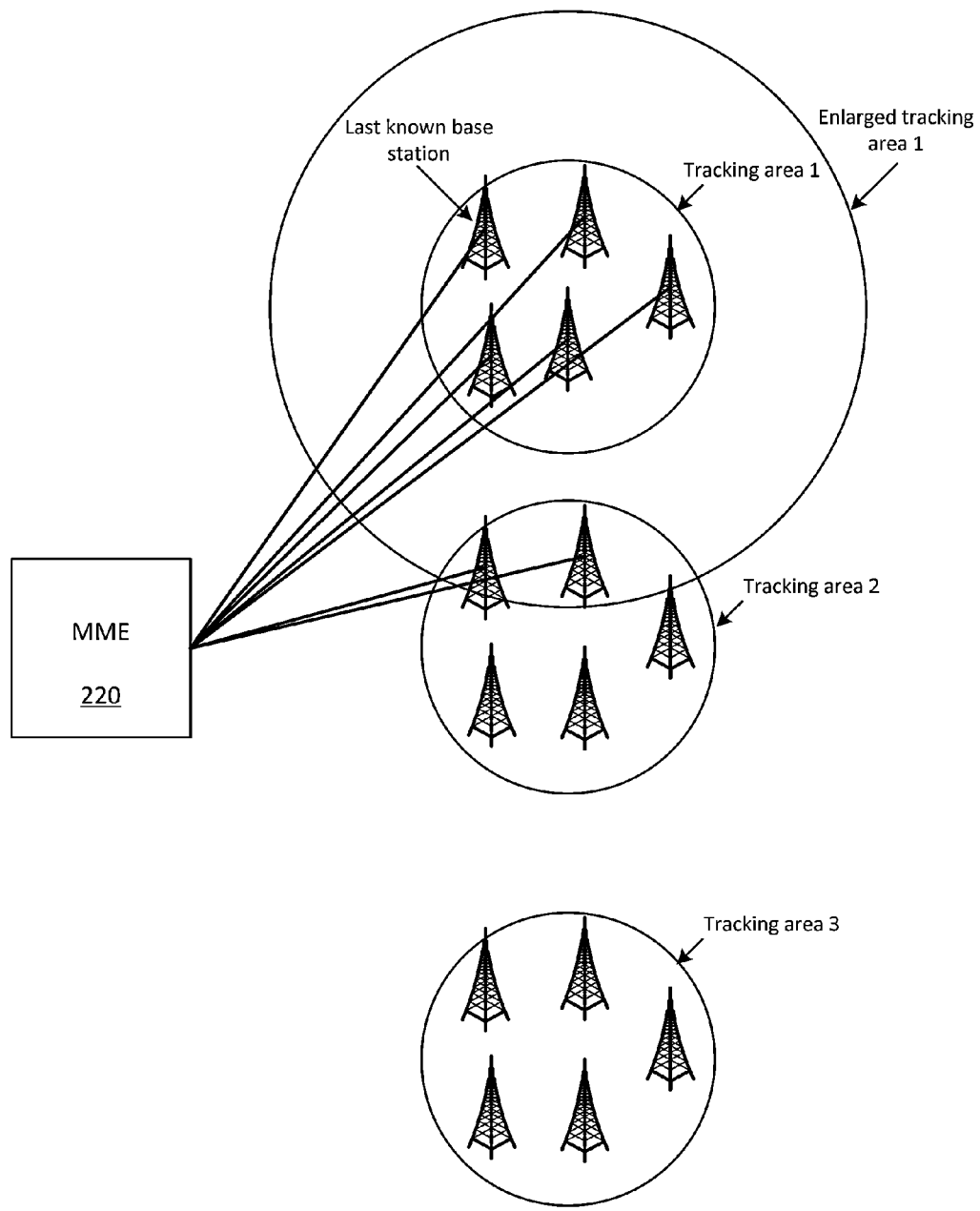

The enlarged last known tracking area paging technique may be a technique whereby MME 220 pages the last known base station 210, base stations 210 in the same tracking area as the last known base station 210, and other base stations 210 that are outside of the same tracking area of the last known base station 210 (e.g., within an enlarged version of the tracking area of the last known base station 210). For instance, the other base stations 210 may be base stations that are within a particular distance of the tracking area of the last base station 210 (e.g., within a particular distance of the edge of the tracking area, within a particular distance of the center of the tracking area, etc.). As shown in FIG. 7, when locating the user device, by using the enlarged last known tracking area paging technique, MME 220 may send a paging request to base stations 210 in an enlarged version of tracking area 1 (e.g., base stations 210 within tracking area 1, as well as other base stations 210 that are near tracking area 1). For instance, the other base stations 210 that are near tracking area 1 may be included in tracking area 2. As shown in the figure, some, but not all, base stations 210 in tracking area 2 may be paged using this technique.

Figure 8:
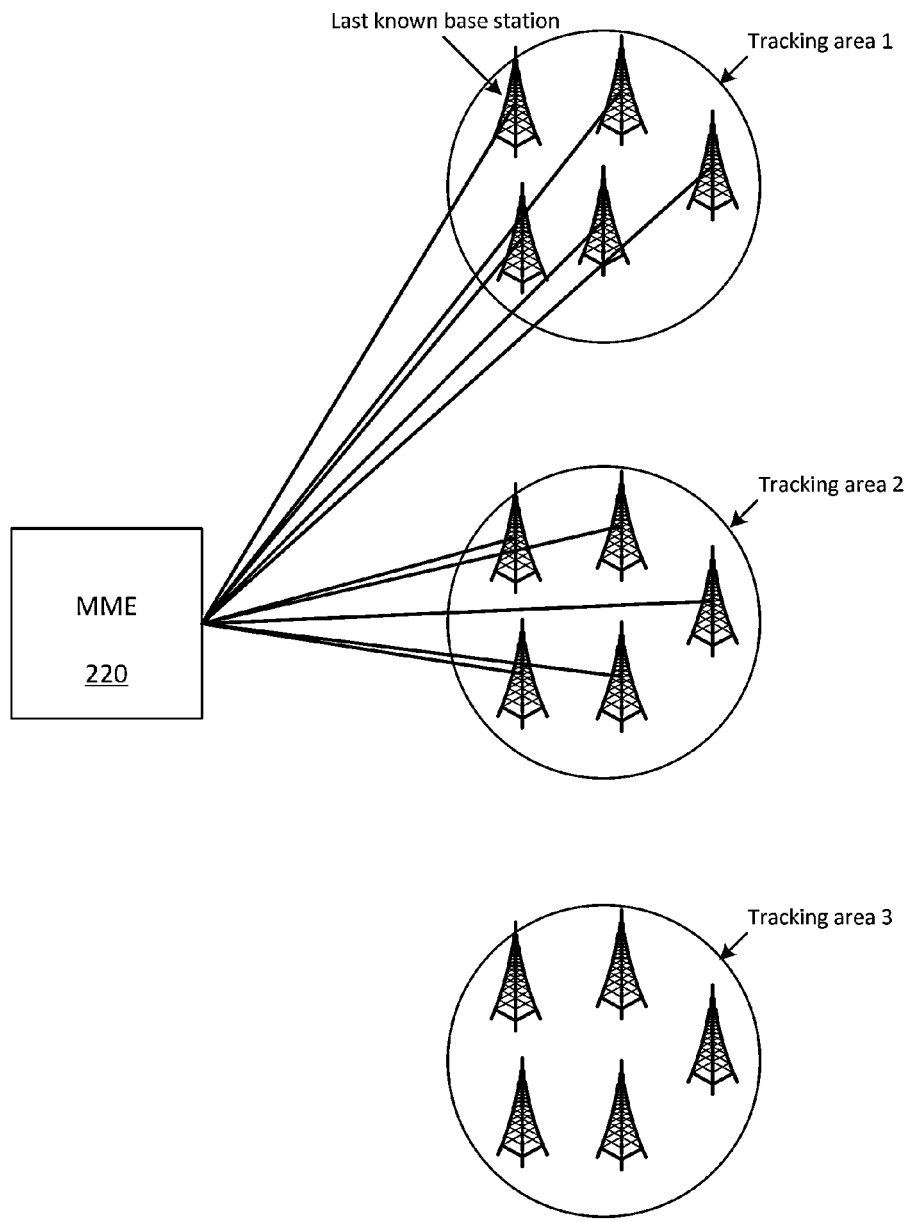
Figure 9:
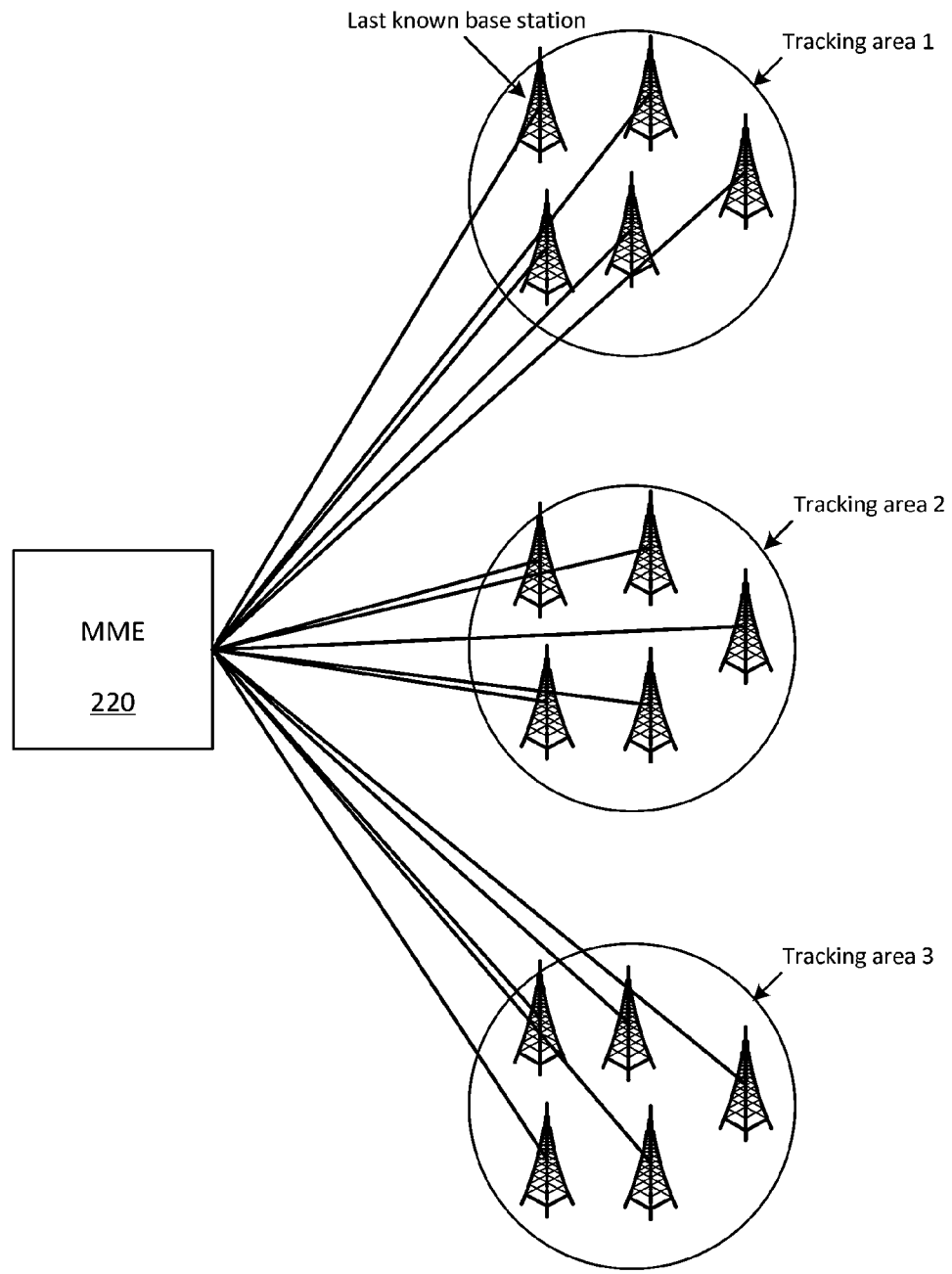

The last known and neighboring tracking areas paging technique may be a technique whereby MME 220 pages base stations 210 in the tracking area of the last known base station 210, as well as other base stations 210 of tracking areas that are near the tracking area of the last known base station 210. For instance, MME 220 may send paging requests to base stations 210 of tracking areas that neighbor (e.g., are within a particular distance of the tracking area of the last known base station 210, intersect with the tracking area of the last known base station 210, are adjacent to the tracking area of the last known base station 210, etc.). As shown in FIG. 8, assume that tracking area 2 is considered a "neighboring" tracking area to tracking area 1. For instance, MME 220 may store information indicating that tracking area 2 is within a particular distance of tracking area 1, and/or may otherwise store information indicating that tracking area 2 is a neighbor of tracking area 1. When locating the user device, by using the last known and neighboring tracking areas paging technique, MME 220 may send a paging request to base stations 210 in tracking area 1 and tracking area 2 (e.g., only to the tracking area associated with the last known base station 210 and the neighboring tracking area, and not to any other base stations 210 of other tracking areas).

The all base stations paging technique may be a technique whereby MME 220 pages all base stations 210 associated with MME 220. For instance, as shown in FIG. 8, when locating the user device, by using the all base stations paging technique, MME 220 may send a paging request to base stations 210 in tracking areas 1-3 (e.g., all of the base stations 210 associated with MME 220).

Thus, the all base stations paging technique may be considered to be the most "aggressive" paging technique, in that this technique consumes the most resources out of the paging techniques discussed, since this paging technique causes the greatest quantity of base stations 210 to be paged. However, since all base stations 210 are paged, the likelihood of locating user device 205 is the greatest using this paging technique, compared to the other paging techniques discussed.

Similarly, the last known base station paging technique may be considered to be the least "aggressive" paging technique of the four discussed, in that this technique consumes the least resources of the paging techniques discussed, since only one base station 210 is paged. Thus, the "aggressiveness" of a paging technique may, in some implementations, refer to a quantity of base stations 210 that are paged by MME 220 when MME 220 is attempting to locate user device 205.

The "aggressiveness" of a paging scheme may be based on how aggressive the paging techniques, that make up the paging scheme, are. For example, referring back to FIG. 3, the paging scheme associated with the voice content type (C, D, D, E) may be considered to be the most aggressive paging scheme in data structure 300, as the cumulative amount of resources that would be consumed, if these paging techniques are all used, are the greatest cumulative amount of resources that would be consumed out of all of the paging schemes shown in FIG. 3. This paging scheme may be considered to be the most aggressive paging scheme shown in FIG. 3, as the first paging technique used (i.e., enlarged last known tracking area) is more aggressive than the first paging technique used by the other paging schemes.

Figure 10:
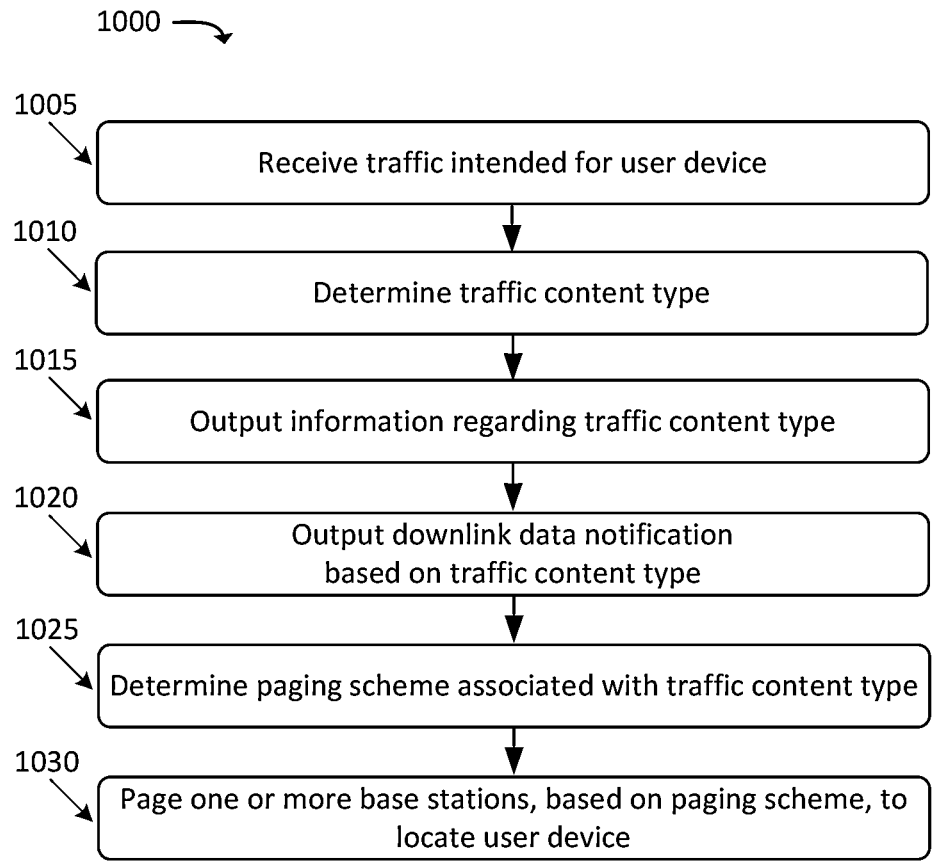
FIG. 10 illustrates an example process for paging one or more base stations based on traffic content type.

FIG. 10 illustrates an example process 1000 for performing base station paging based on traffic content type. In one example implementation, process 1000 may be performed by traffic content analyzer 230. In some implementations, some or all of process 1000 may be performed by one or more other devices in lieu of, or in conjunction with, traffic content analyzer 230. For instance, in some implementations, some or all of process 1000 may be performed by SGW 215 and/or MME 220.

Process 1000 may include receiving traffic intended for a user device (block 1005). For instance, traffic content analyzer 230 may receive traffic intended for a user device. In some implementations, the traffic may include one or more data packets, such as a Session Initiation Protocol ("SIP") packet. The SIP packet may be received from, for example, an IMS network, a particular PDN 245, and/or another network. The traffic may be received via one or more other network devices, such as via PGW 225. In some implementations, in lieu of receiving the traffic, traffic content analyzer 230 may receive information regarding the packet, but not the entire packet itself. For instance, in some such implementations, traffic content analyzer 230 may receive header information of the packet, without receiving some or all of the payload information of the packet.

Process 1000 may also include determining a type of the content of the traffic (block 1010). For instance, traffic content analyzer 230 may identify the traffic content type based on header information associated with the traffic. For instance, assuming that the traffic includes a SIP packet, traffic content analyzer 230 may examine a "content-type" field of the header of the SIP packet to identify the traffic content type. In some implementations, traffic content analyzer 230 may determine the traffic content type using one or more other techniques (e.g., examining other header fields, performing deep packet inspection, etc.).

Process 1000 may further include outputting information regarding the type of the content of the traffic (block 1015). For example, traffic content analyzer 230 may output information regarding the traffic content type (determined at block 1010) to SGW 215, and/or to one or more other devices.

Process 1000 may additionally include outputting a DDN based on the traffic content type (block 1020). For example, SGW 215 (and/or traffic content analyzer 230, in some implementations) may generate a DDN, which indicates the traffic content type. For example, the DDN may include an IMS Application Indicator ("IAI") flag, which indicates the traffic content type. In some implementations, for some traffic content types, the DDN may not include an IAI flag. For example, in some such implementations, the DDN may include an IAI flag that indicates that the traffic content type is a voice call, but may not include an IAI flag when the traffic content type is a SMS message. SGW 215 (and/or, in some implementations, traffic content analyzer 230) may output the DDN to MME 220.

Process 1000 may also include determining a paging scheme associated with the traffic content type (block 1025). For example, MME 220 may use information stored in data structure 300 and/or data structure 400 to determine a paging scheme associated with the traffic content type.

Process 1000 may additionally include paging one or more base stations, based on the paging scheme, to locate the user device (block 1030). For example, MME 220 may page one or more base stations, based on the paging scheme (determined at block 1025), in order to locate the user device for which the traffic (received at block 1005) was intended. Examples of paging, according to various paging schemes, are described above with reference to FIGS. 5-9.

While example process 1000 is described above in terms of devices that may perform certain portions of process 1000 in accordance with some implementations, in practice, variations of process 1000 may be performed by the same devices described above, and/or by different devices. For example, in some implementations, traffic content analyzer 230 may determine (at block 1010) a traffic content type, and may determine a paging scheme associated with the traffic content type. In some such implementations, traffic content analyzer 230 may output a DDN to MME 220, indicating the paging scheme. Additionally, or alternatively, traffic content analyzer 230 may output a DDN to SGW 215, indicating the paging scheme. In some such implementations, SGW 215 may forward the DDN to MME 220.

As another possible variation of process 1000, SGW 215 may determine the paging scheme associated with the traffic content type. In some such implementations, SGW 215 may output a DDN, which indicates the determined paging scheme, to MME 220.

Figure 11:
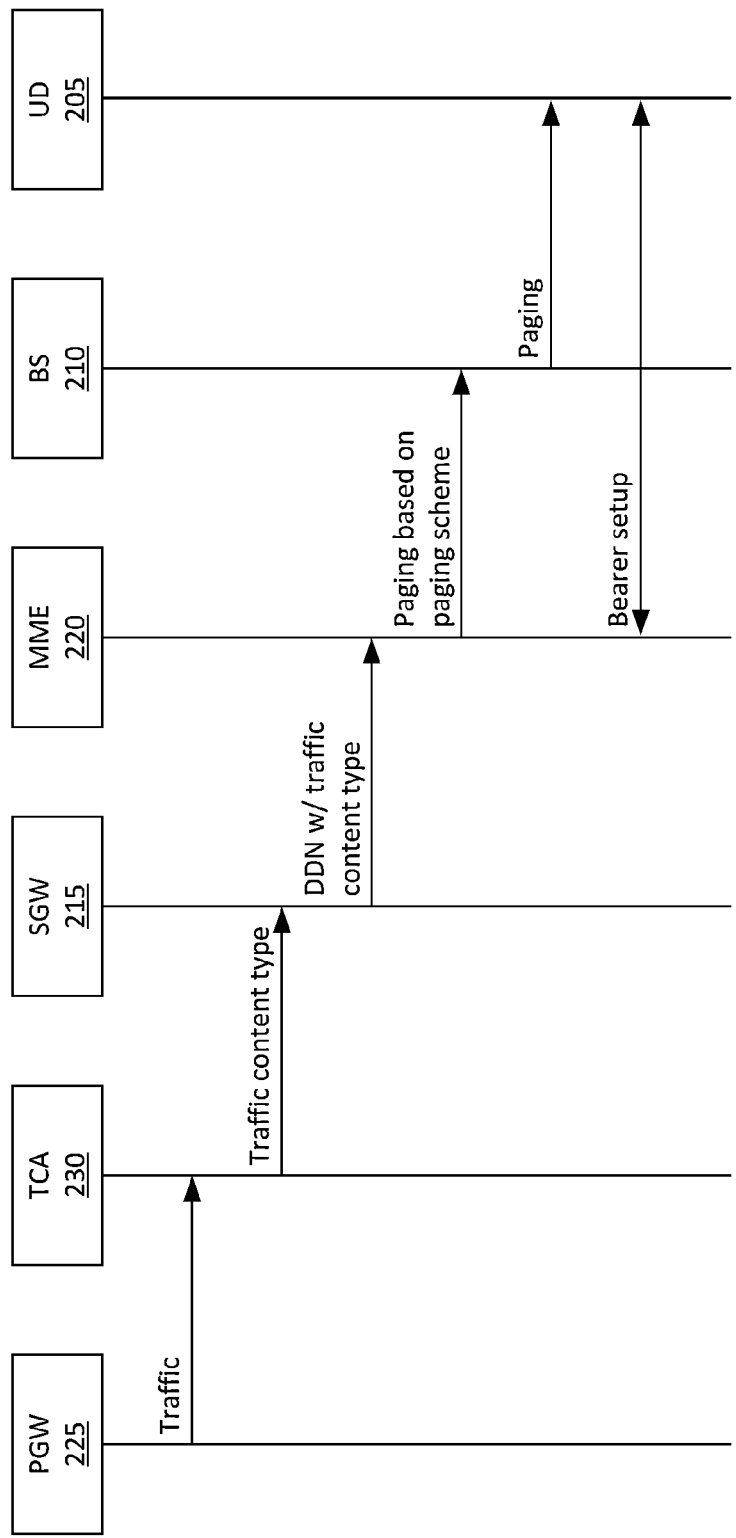
FIGS. 11-13 conceptually illustrate examples of paging one or more base stations based on traffic content type.
Figure 12:
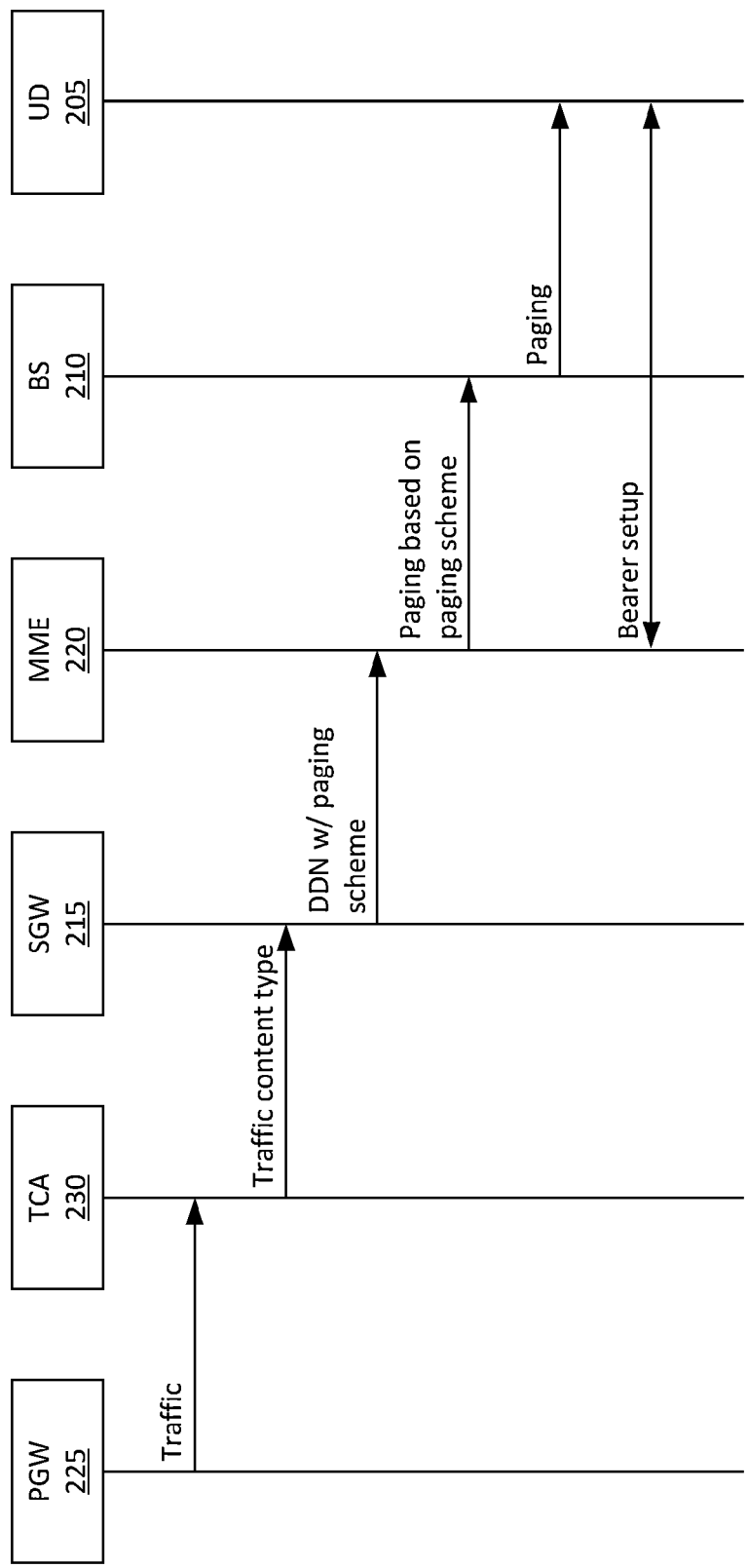
Figure 13:
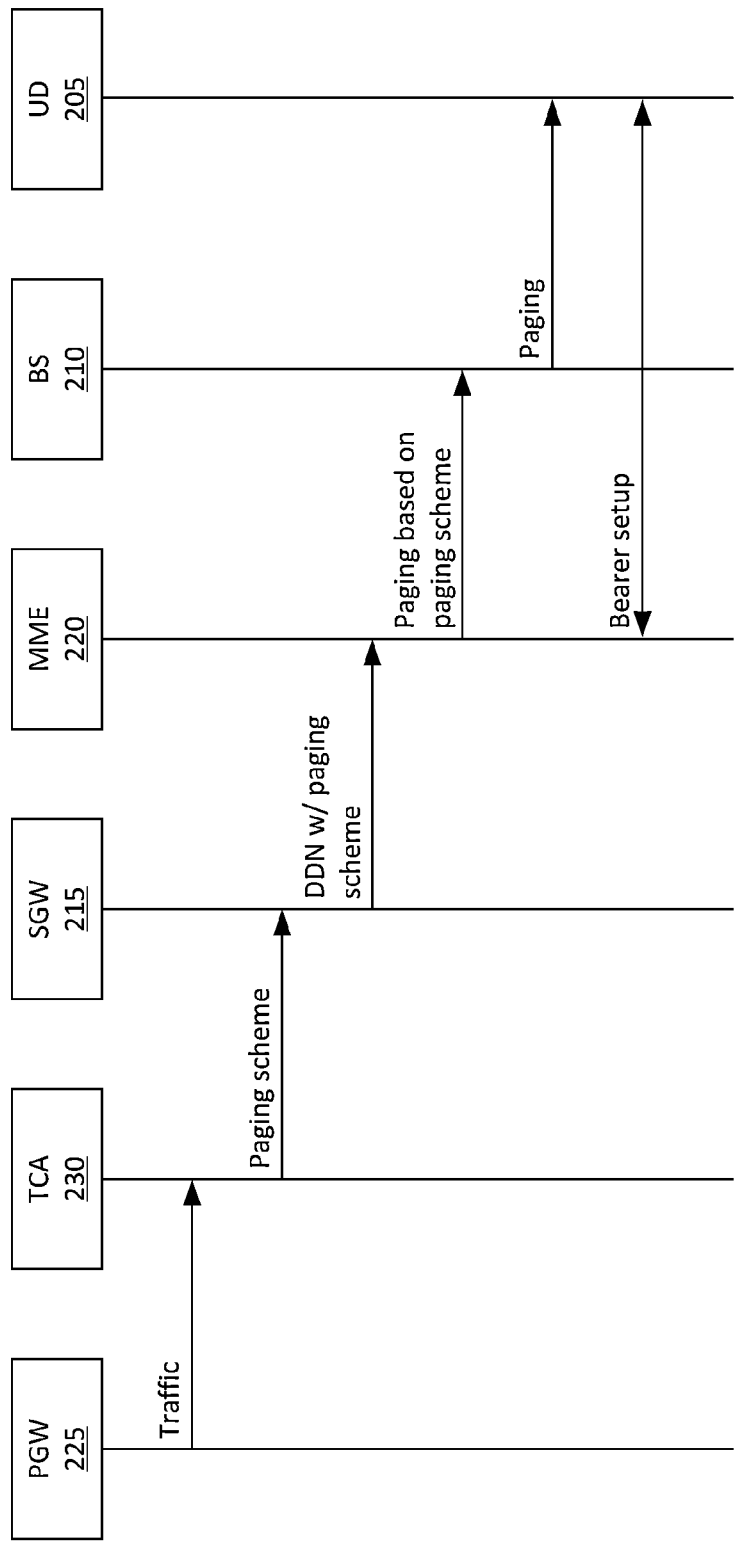

FIGS. 11-13 conceptually illustrate examples of paging one or more base stations based on traffic content type. For example, as shown in FIG. 11, PGW 225 may output traffic to traffic content analyzer 230. This traffic may be received by PGW 225 from one or more networks, such as an IMS network, PDN 245, and/or another network. This traffic may be intended for (e.g., addressed to) a particular user device 205. In some implementations, the traffic may include a SIP packet.

Traffic content analyzer 230 may analyze the received traffic to identify a type of content associated with the traffic. For instance, as described above, traffic content analyzer 230 may examine a header of the packet (e.g., a field in the header that specifies the content type) in order to identify the traffic content type. As further shown in FIG. 11, traffic content analyzer 230 may output a message to SGW 215, indicating the traffic content type.

SGW 215 may generate a DDN, indicating the traffic content type. For instance, the DDN may include an IAI flag, based on the traffic content type. For instance, the IAI flag may have a first value that indicates voice call content, a different second value that indicates video call content, and a different third value that indicates SMS message content. In some implementations, SGW 215 may forgo including an IAI flag for certain types of traffic. For instance, in some such implementations, the DDN may not include an IAI flag for SMS messages. As additionally shown in FIG. 11, SGW 215 may output the DDN to MME 220.

MME 220 may identify a paging scheme, based on the DDN (e.g., based on the presence of the IAI flag, the value of the IAI flag, and/or the absence of the IAI flag). MME 220 may page one or more base stations 210, which may in turn attempt to determine whether the particular user device 205 is attached. For instance, in some implementations, base stations 210 may send a paging beacon, and may determine that user device 205 is attached based on receiving a response, to the paging beacon, from user device 205. Once user device 205 is located, bearer setup may be initiated, and the traffic may be provided to user device 205 via, for example, SGW 215 and base station 210.

FIGS. 12 and 13 illustrate variations on the example shown in FIG. 11. For example, in FIG. 12, SGW 215 may determine the paging scheme associated with the traffic content type, and the DDN (sent from SGW 215 to MME 220) may indicate the paging scheme. MME 220 may, in turn, perform the paging according to the paging scheme indicated in the DDN, in order to locate user device 205.

As shown in FIG. 13, traffic content analyzer 230 may, in addition to determining the traffic content type, also determine the paging scheme associated with the traffic content type. Traffic content analyzer 230 may output a message to SGW 215, indicating the determined paging scheme. SGW 215 may, in turn, output a DDN, that indicates the paging scheme, to MME 220. MME 220 may perform the paging according to the paging scheme indicated in the DDN, in order to locate user device 205.

Figure 14:
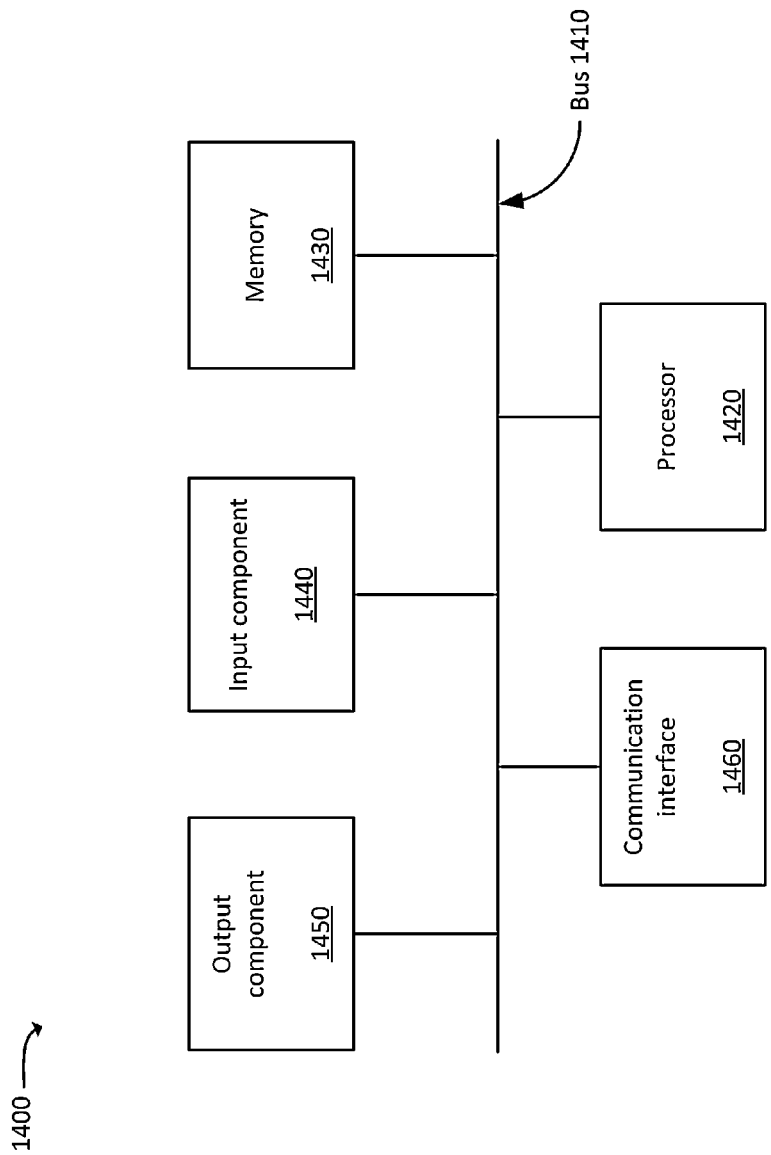
FIG. 14 illustrates example components of one or more devices shown in FIGS. 1, 2, 5-9, and 11-13.

FIG. 14 is a diagram of example components of device 1400. One or more of the devices illustrated in FIGS. 1, 2, 5-9, and 11-13 may include one or more devices 1400. Device 1400 may include bus 1410, processor 1420, memory 1430, input component 1440, output component 1450, and communication interface 1460. In another implementation, device 1400 may include additional, fewer, different, or differently arranged components.

Bus 1410 may include one or more communication paths that permit communication among the components of device 1400. Processor 1420 may include a processor, microprocessor, or processing logic that may interpret and execute instructions. Memory 1430 may include any type of dynamic storage device that may store information and instructions for execution by processor 1420, and/or any type of non-volatile storage device that may store information for use by processor 1420.

Input component 1440 may include a mechanism that permits an operator to input information to device 1400, such as a keyboard, a keypad, a button, a switch, etc. Output component 1450 may include a mechanism that outputs information to the operator, such as a display, a speaker, one or more light emitting diodes ("LEDs"), etc.

Communication interface 1460 may include any transceiver-like mechanism that enables device 1400 to communicate with other devices and/or systems. For example, communication interface 1460 may include an Ethernet interface, an optical interface, a coaxial interface, or the like. Communication interface 1460 may include a wireless communication device, such as an infrared ("IR") receiver, a Bluetooth radio, or the like. The wireless communication device may be coupled to an external device, such as a remote control, a wireless keyboard, a mobile telephone, etc. In some embodiments, device 1400 may include more than one communication interface 1460. For instance, device 1400 may include an optical interface and an Ethernet interface.

Device 1400 may perform certain operations relating to one or more processes described above. Device 1400 may perform these operations in response to processor 1420 executing software instructions stored in a computer-readable medium, such as memory 1430. A computer-readable medium may be defined as a non-transitory memory device. A memory device may include space within a single physical memory device or spread across multiple physical memory devices. The software instructions may be read into memory 1430 from another computer-readable medium or from another device. The software instructions stored in memory 1430 may cause processor 1420 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations. For example, while a series of blocks has been described with regard to FIG. 10, the order of the blocks may be modified in other implementations. Further, non-dependent blocks may be performed in parallel. Additionally, while example signals are shown in FIGS. 11-13, other signals may be sent and/or received before and/or after the signals shown in these figures, in other implementations.

The actual software code or specialized control hardware used to implement an embodiment is not limiting of the embodiment. Thus, the operation and behavior of the embodiment has been described without reference to the specific software code, it being understood that software and control hardware may be designed based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

No element, act, or instruction used in the present application should be construed as critical or essential unless explicitly described as such. Also, as used herein, the article "a" is intended to include one or more items, and may be used interchangeably with the phrase "one or more." Where only one item is intended, the term "one" or similar language is used. Further, the phrase "based on" is intended to mean "based, at least in part, on" unless explicitly stated otherwise.

What is claimed is:

1. A method, comprising:
    receiving, by one or more network devices and from a Packet Data Network Gateway ("PGW"), traffic that is destined for a user device, the traffic including one or more Session Initiation Protocol ("SIP") packets, wherein the one or more SIP packets each include a SIP header,
        wherein the SIP header includes a "content-type" field;
    determining, by the one or more network devices, a type of content associated with the traffic, the determining including analyzing the "content-type" field in the SIP header of the one or more SIP packets; and
    outputting, by the one or more network devices and to a Serving Gateway ("SGW"), information indicating the type of content, that was determined by analyzing the "content-type" field in the SIP header of the one or more SIP packets,
    wherein the SGW notifies a Mobility Management Entity ("MME") of the type of content,
    wherein the MME determines a base station paging scheme based on the type of content that was determined by analyzing the "content-type" field in the SIP header of the one or more SIP packets, and
    wherein the MME pages the user device using the determined base station paging scheme.

2. The method of claim 1, wherein the base station paging scheme indicates one or more paging techniques to be used to locate the user device.

3. The method of claim 2, wherein the base station paging scheme indicates an order of the one or more paging techniques to be used to locate the user device.

4. The method of claim 2, wherein the one or more paging techniques include at least one of:
    a last known base station paging technique that causes the MME to page a particular base station, to which the user device was previously attached,
    a last known tracking area paging technique that causes the MME to page:
        the particular base station to which the user device was previously attached, and
        at least one other base station in a same tracking area as the particular base station;
    a last known and neighboring tracking area paging technique that causes the MME to page:
        the particular base station to which the user device was previously attached,
        at least one other base station in the same tracking area as the particular base station, and
        at least one other base station in a different tracking area as the particular base station; or
    an all base stations paging technique that causes the MME to page all base stations that the MME is capable of paging.

5. The method of claim 1,
    wherein when the content type of the traffic is a voice call, the base station paging scheme is a first paging scheme, and
    wherein when the content type of the traffic is a short message service ("SMS") message, the base station paging scheme is a second paging scheme that consumes less resources than the first paging scheme.

6. The method of claim 1, wherein the paging includes sending paging requests to one or more base stations, the one or more base stations being selected based on the base station paging scheme.

7. The method of claim 6, wherein the locating further includes receiving a response from a particular base station, of the one or more base stations, the response indicating that the user device is attached to the particular base station.

8. The method of claim 1, further comprising:
    causing the traffic to be forwarded to the user device via a particular base station that is identified by using the base station paging scheme.

9. The method of claim 1, wherein the "SGW" and the "MME" are separate devices from the one or more network devices.

10. The method of claim 1, further comprising:
    analyzing additional header information, of the traffic, in addition to the "content-type" field of SIP headers of SIP packets,
    wherein the type of content is determined further based on the additional header information.

11. A computer-readable medium, comprising:
    a plurality of computer-executable instructions, which, when executed by one or more processors of one or more devices, cause the one or more processors to:

receive, from a Packet Data Network Gateway ("PGW"), traffic that is destined for a user device, the traffic including one or more Session Initiation Protocol ("SIP") packets;

analyze a "content-type" field in a SIP header, of the one or more SIP packets, to determine a type of content associated with the traffic, the type of content being determined based on the "content-type" field of the SIP header of the one or more SIP packets; and output, to a Serving Gateway ("SGW"), information indicating the type of content, that was determined by analyzing the "content-type" field in the SIP header of the one or more SIP packets, wherein the SGW notifies a Mobility Management Entity ("MME") of the type of content, wherein the MME determines a base station paging scheme based on the type of content that was determined by analyzing the "content-type" field in the SIP header of the one or more SIP packets, and wherein the MME pages the user device using the determined base station paging scheme.

12. The computer-readable medium of claim 11, wherein the base station paging scheme indicates one or more paging techniques to be used to locate the user device.

13. The computer-readable medium of claim 12, wherein the base station paging scheme indicates an order of the one or more paging techniques to be used to locate the user device.

14. The computer-readable medium of claim 12, wherein the one or more paging techniques include at least one of:
 a last known base station paging technique that causes the MME to page a particular base station, to which the user device was previously attached,
 a last known tracking area paging technique that causes the MME to page:
  the particular base station to which the user device was previously attached, and
  at least one other base station in a same tracking area as the particular base station;
 a last known and neighboring tracking area paging technique that causes the MME to page:
  the particular base station to which the user device was previously attached,
  at least one other base station in the same tracking area as the particular base station, and
  at least one other base station in a different tracking area as the particular base station; or
 an all base stations paging technique that causes the MME to page all base stations that the one or more network devices are capable of paging.

15. The computer-readable medium of claim 11,
wherein when the content type of the traffic is a voice call, the base station paging scheme is a first paging scheme, and
wherein when the content type of the traffic is a short message service ("SMS") message, the base station paging scheme is a second paging scheme that consumes less resources than the first paging scheme.

16. The computer-readable medium of claim 11, wherein the locating includes:

sending paging requests to one or more base stations, the one or more base stations being selected based on the base station paging scheme, and receiving a response from a particular base station, of the one or more base stations, the response indicating that the user device is attached to the particular base station.

17. A system, comprising:
a traffic content analyzer device to:
 receive, from a Packet Data Network Gateway ("PGW"), traffic that is destined for a user device, the traffic including one or more Session Initiation Protocol ("SIP") packets;
 analyze a "content-type" field in a SIP header, of the one or more SIP packets, to identify a type of content associated with the one or more SIP packets, and
 output a first message that indicates the identified type of content;
a Serving Gateway ("SGW") to:
 receive the first message from the traffic content analyzer device,
 determine a paging scheme based on the type of content indicated in the first message, and
 output a second message that indicates the determined paging scheme; and
a mobile management entity ("MME") device to:
 receive the second message from the SGW, and
 locate an intended recipient of the data packet by paging one or more base stations using the paging scheme indicated in the second message.

18. The system of claim 17,
wherein the traffic content analyzer is a device that is separate from the SGW and the MME device.

19. The system of claim 17, wherein the base station paging scheme indicates an order of one or more paging techniques to be used to locate the user device.

20. The system of claim 19, wherein the intended recipient is a user device, wherein the one or more paging techniques include at least one of:
 a last known base station paging technique that causes the MME to page a particular base station, to which the user device was previously attached,
 a last known tracking area paging technique that causes the MME to page:
  the particular base station to which the user device was previously attached, and
  at least one other base station in a same tracking area as the particular base station;
 a last known and neighboring tracking area paging technique that causes the MME to page:
  the particular base station to which the user device was previously attached,
  at least one other base station in the same tracking area as the particular base station, and
  at least one other base station in a different tracking area as the particular base station; or
 an all base stations paging technique that causes the MME to page all base stations that the MME is capable of paging.

* * * * *